United States Patent
ML et al.

(10) Patent No.: US 11,838,171 B2
(45) Date of Patent: Dec. 5, 2023

(54) PROACTIVE NETWORK APPLICATION PROBLEM LOG ANALYZER

(71) Applicant: CERNER INNOVATION, INC., Kansas City, KS (US)

(72) Inventors: Shwetha ML, Karnataka (IN); Praveen Thadigiri, Karnataka (IN); Giri Narayanan, Karnataka (IN); Shiv Shankar, Karnataka (IN); Girish S, Karnataka (IN); Darshan S, Karnataka (IN)

(73) Assignee: CERNER INNOVATION, INC., Kansas City, MO (US)

( * ) Notice: Subject to any disclaimer, the term of this patent is extended or adjusted under 35 U.S.C. 154(b) by 45 days.

(21) Appl. No.: 17/499,281

(22) Filed: Oct. 12, 2021

(65) Prior Publication Data

US 2023/0113860 A1   Apr. 13, 2023

(51) Int. Cl.
| | |
|---|---|
| *H04L 41/069* | (2022.01) |
| *H04L 43/16* | (2022.01) |
| *H04L 41/0604* | (2022.01) |
| *G06F 40/20* | (2020.01) |
| *H04L 41/22* | (2022.01) |

(52) U.S. Cl.
CPC .......... *H04L 41/0622* (2013.01); *G06F 40/20* (2020.01); *H04L 41/069* (2013.01); *H04L 41/22* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 6,041,365 A * | 3/2000 | Kleinerman | G06F 9/546 719/328 |
| 6,678,639 B2 | 1/2004 | Little et al. | |
| 7,051,243 B2 | 5/2006 | Helgren et al. | |
| 7,146,535 B2 | 12/2006 | Little et al. | |
| 7,296,194 B1 * | 11/2007 | Lovy | H04L 43/0805 709/224 |
| 7,475,293 B1 | 1/2009 | Little et al. | |
| 7,668,953 B1 * | 2/2010 | Sinclair | H04L 41/16 709/224 |
| 8,296,278 B2 | 10/2012 | Abraham | |
| 10,652,103 B2 * | 5/2020 | Anderson | H04L 41/5074 |
| 10,756,949 B2 * | 8/2020 | Kulshreshtha | H04L 41/0631 |
| 11,050,609 B2 * | 6/2021 | Vaderna | H04L 41/0622 |

(Continued)

*Primary Examiner* — Kenny S Lin
(74) *Attorney, Agent, or Firm* — Invoke (57) ABSTRACT

Methods, systems, and computer-readable media are disclosed herein for proactively managing computing problems. In aspects, an execution of a script is initiated. A connection may be established via the script and the central database for identifying a network quality issue. The network quality issue may be identified more than once. Further, the network quality issue may be identified based on the network quality issue satisfying a threshold. Additionally, it may be determined that the network quality issue that satisfies the threshold is not associated with an electronic documentation based on a search in the central database. Based on determining the network quality issue is not associated with the electronic documentation, the electronic documentation may be created for the network quality issue that satisfies the threshold.

19 Claims, 6 Drawing Sheets

(56) References Cited

U.S. PATENT DOCUMENTS

| | | | | |
|---|---|---|---|---|
| 2003/0126136 | A1* | 7/2003 | Omoigui | H04L 67/02 |
| 2005/0163047 | A1* | 7/2005 | McGregor | H04W 24/00 |
| | | | | 370/229 |
| 2008/0172409 | A1* | 7/2008 | Botros | G06F 16/9038 |
| 2009/0089252 | A1* | 4/2009 | Galitsky | G06F 16/245 |
| 2010/0070448 | A1* | 3/2010 | Omoigui | H01L 27/1463 |
| | | | | 706/55 |
| 2010/0290346 | A1* | 11/2010 | Barford | H04L 63/1425 |
| | | | | 370/242 |
| 2011/0307863 | A1* | 12/2011 | Malnati | H04L 41/0681 |
| | | | | 717/123 |
| 2012/0197934 | A1* | 8/2012 | Zhang | G06F 16/24568 |
| | | | | 707/E17.014 |
| 2013/0185286 | A1* | 7/2013 | Galitsky | G06F 16/332 |
| | | | | 707/722 |
| 2020/0050942 | A1* | 2/2020 | Sun | G06F 40/40 |
| 2020/0092160 | A1* | 3/2020 | Yoon | G06F 11/0793 |
| 2020/0371892 | A1* | 11/2020 | Huang | G06F 11/3612 |
| 2021/0377106 | A1* | 12/2021 | Ledbetter | H04L 41/0631 |

\* cited by examiner

PROACTIVE NETWORK APPLICATION PROBLEM LOG ANALYZER

BACKGROUND

The use of problem logging is used for maintaining large-scale online service systems. When such a service fails, recorded problem logs are examined for gaining insights into the failure of the service to identify insights associated with the failure. For example, an engineer may perform a keyword query (e.g., "error" and "exception") of recorded problem logs associated with the failure. This approach is often time consuming and error prone. For example, the engineer may need to examine a large number of log sequences to identify the problem. A system or method that significantly reduces the number of logs to be examined while simultaneously improving the identification accuracy would be beneficial. Additionally, a system or method that performs root cause analysis on particular types of failures would also be beneficial at least because it would reduce the volume of problem log examination and improve detection accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media that proactively manage computing problems via a central database. In aspects, a proactive management tool or system initiates execution of a script. A connection is established with a central database based on the script execution. The connection is used to identify a network quality issue based on electronic information accessible via the connection with the central database. Further, the tool or system may identify the network quality issue by determining that the network quality issue satisfies a threshold. The tool or system may also determine a cause of the network quality issue. Additionally, the tool or system may determine the network quality issue is not associated with an electronic documentation. Based on the network quality issue not being associated with the electronic documentation, the tool or system may create the electronic documentation for the network quality issue. The electronic documentation may be stored at the central database.

BRIEF DESCRIPTION OF THE DRAWINGS

Aspects are described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Beginning with the terms "network issue" and "network quality issue," these terms are used interchangeably herein to refer to a technological problem or computing issue that causes a reduction in the quality of a service provided by a network. As an example, a network quality issue may include an interruption associated with the service provided by the network. As another example, the network quality issue may refer to a degradation in response time by the service or another error associated with a response of the service. In aspects, an application may be running "slow" relative to predefined baseline or historical baseline. Continuing the example, an application that is running slow may cause a system to fail or "crash." Examples of network issues may include an application error, a connection error, a domain name system error, a link or node failure, a control plane failure, or the like.

Network issues may be described in terms of a technological symptom, a technological cause, and a technological solution. For example, a network quality issue involving slower performance of an application may include a technological symptom of "freezing," wherein the technological cause of the slower performance is due to an interference from a backup server. In some aspects, an additional symptom associated with the slower performance may include an Ethernet error (e.g., an alignment error), wherein the cause of the slower performance is due to packet loss on the network. In aspects, one solution to the slower performance of the application includes capturing network traffic via a client device and determining whether retransmission exists.

Turning now to the term "electronic documentation," this term used herein refers to electronic media content usable in electronic form for the documentation of a computing issue, such as a network quality issue. Electronic documentation may comprise a problem ticket, which is a report of a computing issue including information about a symptom of the computing issue (e.g., such as those generated in a help-desk or call-center environment). The electronic documentation may include information in addition to the problem ticket or information extracted from the problem ticket. For example, electronic documentation may comprise operational data corresponding to the computing issue. For example, the operational data may include operations performed by a processor within a time range prior to the experienced computing issue. A system administrator may handle the electronic documentation in some embodiments.

Computing issues documented by the electronic documentation may be associated with a particular machine, hardware, or host, for example.

As used herein, a "client" refers to computing hardware or software that is accessing a service via a server within a client-server network. For example, the client may access a service provided by the proactive problem analyzer, such as storing data into a central database of the proactive problem analyzer.

The term "mnemonic" and "mnemonics" are used interchangeably to refer to information relating to a network quality issue that a client has reported. Client mnemonics may refer to a name or unique identifier of the client. Mnemonics may also include mnemonic codes a client uses to specify computing instructions, such as a computing function, service, or process (e.g., moving data from one computer storage location to another). A first client may use a different mnemonic code for a first function than a second client, in some embodiments.

As used herein, a "problem keyword" or a "keyword" refers to a key term that is associated with a technological problem or computing issue that causes a reduction in the quality of a service provided by a network. The problem keyword or the keyword may be used in text mining, information retrieval, and natural language processing. For example, a keyword may be used for querying a central database comprising electronic documentation for information within the central database that contains the keyword being searched.

As used herein, a "source" of data refers to data from a particular client device, a particular set of data (e.g., a particular table or dataset), data from a particular entity (e.g., data from one corporation or one specific department of that corporation, data from one hospital or from one department of the hospital, or data from a particular group of client devices associated with a particular manager), and so forth.

The term "threshold" or "threshold value" refers to a value defining an upper limitation or a lower limitation. In aspects, a value being compared to the threshold may be equal to the threshold. For instance, a value that "satisfies" a threshold may be equal to or lower than the threshold. In some aspects, a value that "satisfied" a threshold may be equal to or above the threshold. In some aspects, a value satisfying the threshold may be above the threshold. In some aspects, the value satisfying the threshold equals the threshold. In aspects, two thresholds may define a range.

Furthermore, terms such as "first" and "second," and other numerical terms, are used herein to differentiate between one or more terms that may have a relation. These terms are not used to indicate relative timing, order, placement, severity, priority, importance, or the like, unless expressly described as such.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Overview

At a high level aspect herein provide a proactive network application problem log analyzer tool. Generally, a script is initiated that retrieves data that correspond to a period of time, such as a 30 day period. The data includes a client identifier, a network quality issue, and a quantity or "count" for each error logged for that network quality issue. The script categorizes the retrieved data into a logging table. The logging table is organized by client. Further, in the logging table, the total quantity of errors that have been logged for each network quality issue during the period of time are summed, respectively. The script continues by searching a threshold table using a problem keyword that is associated with the network quality issue. The script locates a threshold that correspond to the problem key problem keyword that is associated with the network quality issue and automatically determines whether the total quantity of occurrences for that network quality issue in the logging table meets or exceeds the corresponding threshold in the threshold table. For example, the script searches for the network quality issue using the problem keyword "Node down" in a threshold table and determines whether a total quantity of occurrences for that network quality issue "Node down" in the logging table meets or exceeds the specific corresponding threshold for that parameter in the threshold table.

When the threshold is at least met, the script determines that the network quality issue is a recurring issue based on satisfaction of the threshold. Additionally, the script determines whether electronic documentation has been previously generated for the network quality issue. When the script determines that electronic documentation has not been generated for the network quality issue, new electronic documentation is automatically generated that can be used to initiate a root cause analysis of the network quality issue that is the recurring issue based. The network quality issue is added automatically to a queue, and an electronic notification is automatically communicated to a user or client. The script continues by performing this sequence for each of the plurality of network quality issues within the logging table.

System and Methods

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, existing systems that generate problem tickets use system administrators to analyze and resolve each of the problem tickets. Analyzing each of the problem tickets, as performed by the existing systems, is time consuming and drains both computing and human resources. For example, some existing systems additionally analyze problem tickets that have already been resolved. As another example, some existing systems additionally analyze problem tickets that were stored as duplicates. As another example, some existing systems that generate problem tickets do not properly format and generate the problem tickets for accurate extraction of information for problem detection and analysis.

Due to high volumes and latency issues, other systems are slow to identify and subsequently resolve problem tickets. Due to other systems slowly identifying and resolving problem tickets due to the deficiencies described above corresponding to high volumes of problem tickets (e.g., hundreds of thousands of incidents within a month) thwarting analytical procedures, other systems experience system crashes due to the failure to resolve problem tickets in shorter periods of time. For instance, the use of manual efforts to log problem tickets and to generate resolutions for the logged problem tickets is one cause for these deficiencies in other methods and systems.

In addition, another reason for the deficiencies described above includes the fact that the process of analyzing the logged problem tickets includes too much information without the proper organization of that information. Stated differently, other systems and methods fail to properly utilize computing resources to reduce computing processing efforts, computing storage space, and energy required to generate electronic documents comprising the proper tools for speedy and accurate problem detection and subsequent documentation. As such, systems and methods described herein remedy the deficiencies described above in the other systems and methods.

For example, the technology described herein provides for a centralized problem analyzing system for proactively managing and diagnosing computing worklog problems. For example, the system comprises a central database, a processor, and computer memory storing computer-usable instructions that, when executed by the processor, perform operations. For example, the operations can include initiating execution of a script. Additionally, the operations comprise establishing a connection via the script and the central database for identifying a network quality issue. The network quality issue may be identified based on the network quality issue satisfying a threshold. Further, the network quality issue may not be associated with an electronic documentation. As such, the system creates the electronic documentation.

In another aspect, the technology described herein also provides for one more non-transitory computer-readable media having computer-executable instructions. The instructions, when executed by a processor, may perform a method for proactively managing computing problems. The method may include initiating execution of a script and establishing a connection via the script and a central database for identifying a network quality issue. The central database may comprise indexed data from a plurality of network quality issues from a plurality of sources. The indexed data may be indexed based on a client, a network quality issue type, and a keyword. Further, the network quality issue may be identified via a first query of the central database, the network quality issue being identified based on the network quality issue satisfying a threshold. In addition, a cause may be determined for the network quality issue based on a second query of the central database. Furthermore, the network quality issue may not be associated with an electronic documentation. As such, the electronic documentation may be created.

In yet another aspect, the technology described herein provides for a computerized method for proactively managing computing problems. At a central database, a plurality of network quality issues are received from a plurality of sources. The plurality of network quality issues may comprise operational data and client information. The plurality of network quality issues may be indexed based on a client and a network quality issue type. Further, the method may initiate execution of a script. Additionally, a connection may be established via the script and the central database for identifying a network quality issue. In addition, a first network quality issue may be identified based on satisfying a first threshold. A second network quality issue may also be identified based on satisfying a second threshold. A first electronic documentation may then be created for the first network quality issue and a second electronic documentation may be created for the second network quality issue.

Figure 1:
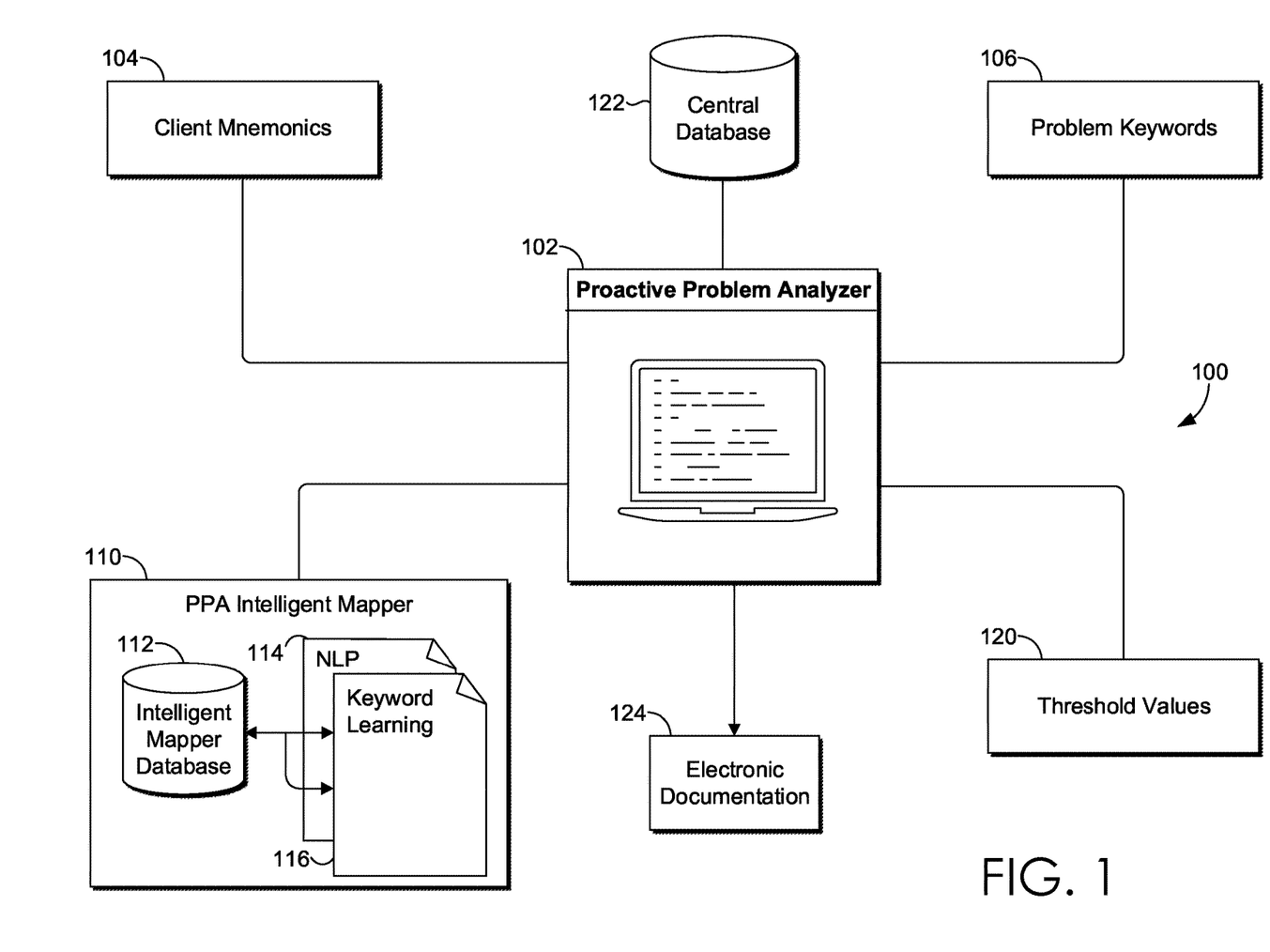
FIG. 1 is an example computing system of the proactive problem analyzer that proactively manages computing problems using a central database, in accordance with aspects of the present disclosure.

Turning now to FIG. 1, a computing system 100 is provided for proactive network application problem analysis. It will be understood by those of skill in the art that the environment of computing system 100 is just one example of a suitable system for implementing media and methods described herein that is not intended to limit the scope of use or functionality of the present invention. The computing system 100 is simplified to illustrate devices, components, and modules in merely one of many suitable configurations and arrangements, such that configurations and arrangements of devices, components, and modules relative to one another, as well as the quantity of each of the devices, components, and modules, can vary from what is depicted (e.g., devices, components, and modules may be omitted or could be greater in quantity than shown). As such, the absence of devices, components, and modules from FIG. 1 should be not be interpreted as limiting the present invention to exclude additional devices, components, and modules and combination(s) of devices, components, and modules.

Similarly, the computing system 100 should not be interpreted as imputing any dependency between devices, components, and modules, nor imputing any requirements with regard to each of the devices, components, modules, and combination(s) of such, as illustrated in FIG. 1. Also, it will be appreciated by those having ordinary skill in the art that the connections illustrated in FIG. 1 are also example as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the example connections of FIG. 1 may be hardwired or wireless, and may use intermediary components that have been omitted or not included in FIG. 1 for simplicity's sake.

In FIG. 1, the computing system 100 illustrates an embodiment of a proactive problem analyzer (PPA) that proactively manages computing problems using a central database. For example, the computing system 100 comprises PPA 102; client mnemonics 104; problem keywords 106; PPA intelligent mapper 110 having an intelligent mapper database 112, a natural language processor (NLP) 114, and keyword learning 116; threshold values 120; central database 122, and electronic documentation 124.

Beginning with PPA 102, PPA 102 uses near real-time data from the central database 122 to actively and continuously identify trends. In general, PPA 102 actively creates electronic documentation (e.g., electronic documentation 124) for those trends based on the absence of electronic documentation corresponding to each trend identified by the PPA 102. Trends may be identified using the PPA intelligent mapper 110, described below. PPA 102, in communication with central database 122, uses data stored in the central database 122 along with client mnemonics 104, problem keywords 106, intelligent mapper 110, and threshold values 120 for generating the electronic documentation 124.

Turning to client mnemonics 104, PPA 102 may initiate execution of a script for receiving information relating to a network quality issue that a client has reported, the information including client mnemonics 104. For example, PPA 102 may receive information such as, for example, a name or unique identifier of the client, a type or kind of the network quality issue, a number or quantity corresponding to a server that is associated with the network quality issue of the client, a physical or virtual location of the client, a physical or virtual location of the server, and the like. In aspects, the client mnemonics 104 include navigational mnemonics for locating functions performed that are associated with tasks and the network quality issue. Client mnemonics 104 may be received as mnemonic codes that specify instructions, which the PPA 102 may recognize and transform into a standard mnemonic code. The client mnemonics 104 received may be stored in central database 122. In some aspects, client mnemonics 104 are stored in the central database 122 in the original mnemonic code prior to the PPA 102 transforming it into the standard mnemonic code. In some aspects, client mnemonics 104 are stored in the central database 122 in the standard mnemonic code.

Turning to problem keywords 106, problem keywords 106 may be associated with the network quality issue or a related network quality issue. For example, PPA 102 may receive client mnemonics 104 associated with a network quality issue that is related to another reported network quality issue from the same client having a set of problem keywords 106. In other words, a problem keyword indicates a particular type of network quality issue. For example, multiple network quality issues (e.g., long data responses for a data analytics service and an inaccurate analysis) may all be determined to be of the same or similar type such that those network quality issues can each be associated with the same problem keyword (e.g., improper architecture approach). Accordingly, a problem keyword descriptive of the network quality issue may be associated with a set of mnemonics received by PPA 102 from a client.

Continuing the example, PPA 102 may autonomously determine that the most common keyword for the network quality issue is the same keyword as that of the set of problem keywords from the another reported issue in electronic documentation in a worklog. The "most common" keyword is determined based on the relative quantity and/or the relative rate of occurrences of the keyword within a client-specific worklog and/or within worklogs for a plurality of clients. Additionally, the problem keywords may be derived after filtering the received client mnemonics 104 and removing duplicate information. Further, PPA 102 may autonomously determine a top list of problem keywords associated with the network quality issue. For example, from the data received, "internet connectivity" may be the most common problem keyword among all of the problem keywords within the data received. Continuing the example, the second most common problem keyword among all of the problem keywords may include a name of a particular network, e.g., network ABC123.

Turning to PPA intelligent mapper 110, PPA intelligent mapper 110 comprises intelligent mapper database 112, natural language processor (NLP) 114, and keyword learning 116 for generating a dataset for subsequent electronic documentation of the network quality issue. For example, intelligent mapper database 112 can store data processed by NLP 114, such as data associated with the network quality issue, with historical network quality issues associated with the same client and/or with other clients, and with incoming network quality issues occurring simultaneously or within temporal proximity to one or more occurrences of the network quality issue. In some aspects, PPA intelligent mapper 110 implements keyword learning 116 for pattern identification by training a machine learning model using a set of training data having at least one problem keyword 106 that is a keyword of the network quality issue. In aspects, the training data is associated with a group of network quality issues that all have at least one symptom in common with each other, and/or in common with a particular network quality issue. In aspects, the training data is associated with other distinct network quality issues that each have a minimum number of symptoms that are the same as the symptoms of the particular network quality issue, where the minimum number or quantity is determined by a predefined threshold.

In aspects, PPA intelligent mapper 110 analyzes a plurality of network quality issues by retrieving the plurality of network quality issues from intelligent mapper database 112. In aspects, the plurality of network quality issues are associated with one or more different or distinct clients from one or more different or distinct sources. PPA intelligent mapper 110 may analyze the plurality of network quality issues to identify a pattern for generating the dataset for subsequent electronic documentation of the network quality issue. The intelligent mapper 110 may analyze operational data associated with the plurality of network quality issues to autonomously identify a pattern within the operational data. The pattern may be autonomously identified based on a query of the intelligent mapper database 112 for a keyword identified by PPA 102 as a problem keyword 106. In some aspects, the pattern is identified by analyzing a set of data corresponding to the plurality of network quality issues, the set of data associated with the problem keyword 106, wherein the problem keyword 106 indicates a type of network quality issue for each of the plurality of network quality issues in the set of data. Continuing the example, the pattern is then identified from the set of data using NLP 114. In some aspects, the pattern is identified by also analyzing prior electronic documentation of the set of data using NLP 114.

In some aspects, the keyword learning 116 comprises a machine learning model receiving an input of problem keyword 106. In response, a set of problem keywords associated with the plurality of network quality issues stored in the intelligent mapper database 112 are searched. In some aspects, the set of problem keywords being searched correspond to certain network quality issues that occurred within a defined period of time. In some aspects, data (corresponding to the certain network quality issues) being searched includes client data of at least two different clients from respective sources. In some aspects, the data searched includes operational data included in prior electronic documentation stored in central database 122. Based on the search, a set of the data is obtained that relates to the problem keyword 106 for subsequent electronic documentation of the network quality issue. That is, the machine learning model may generate a dataset usable for electronic documentation, wherein the dataset is associated with the problem keyword 106.

Turning to threshold values 120, PPA intelligent 102 compares the dataset generated for the electronic documentation to a threshold value 120. In aspects, a first dataset generated for a first network quality issue is compared to a first threshold and a second dataset generated for a second network quality issue is compared to a second threshold. In some aspects, PPA 102 determines whether a keyword corresponding to a network quality issue is meets or exceeds a threshold. For example, a dataset may not be generated until the threshold is met and "satisfied." In some embodiments, the plurality of network quality issues queried within central database 122 are only searched when the keyword corresponding to each of the network quality issues is at or above the threshold. In some embodiments, the network quality issue satisfying the threshold triggers generation of the corresponding dataset. Each network quality issue may be associated with the same threshold or each may be a different corresponding threshold, in various embodiments.

Turning to central database 122, the central database 122 comprises stored electronic documents corresponding to the plurality of network quality issues. In some aspects, the plurality of network quality issues are received from various sources. For example, the various sources may include a hospital and a laboratory unaffiliated with the hospital (e.g., no prior or current service contracts between the hospital and the laboratory). In an aspect, for each corresponding electronic document, a network quality issue table is updated by adding an entry including one or more symptoms of the network quality issue, a symptom status (e.g., "active" or "resolved"), a time stamp, a hypervisor, a machine identifier, and so forth. In some aspects, central database 122 stores symptoms, causes, solutions, and remedial actions associated with historical network quality issues. In aspects, the symptoms, causes, solutions, and remedial actions are stored using NLP 114 and keyword learning 116.

Turning to electronic documentation 124, electronic documentation 124 is generated for root cause analysis of the network quality issue. The electronic documentation 124 may include one or more causes corresponding to the one or more symptoms of the network quality issue. Additionally, the electronic documentation 124 may include one or more solutions previously used by the same or a different client to another network quality issue having the same or similar keywords or phrase as the network quality issue. For example, a solution used for the another network quality issue may have corresponding client mnemonics 104 having a number of a particular keyword occurrences that is at or above a threshold, wherein the particular keyword is determined to be the most common word associated with the dataset generated by the PPA intelligent mapper 110 for the network quality issue. As another example, a solution associated with another dataset generated by the PPA intelligent mapper 110 for the another network quality issue may have a most common keyword that is also the most common word associated with the dataset generated by the PPA intelligent mapper 110 for the network quality issue, such that two distinct datasets have corresponding solutions that are associated with the same keyword, wherein that keyword has the highest frequency of occurrence in those respective datasets.

Further, electronic documentation 124 may be transmitted to a computing device or storage system associated with another organization. Additionally, electronic documentation 124 may be transmitted in a plurality of standardized formats and computing languages. In some aspects, the electronic documentation 124 is simultaneously stored in central database 122 and transmitted via a wireless communication link or a physical wire (e.g., optical fiber cable) to a receiving device.

Figure 2:
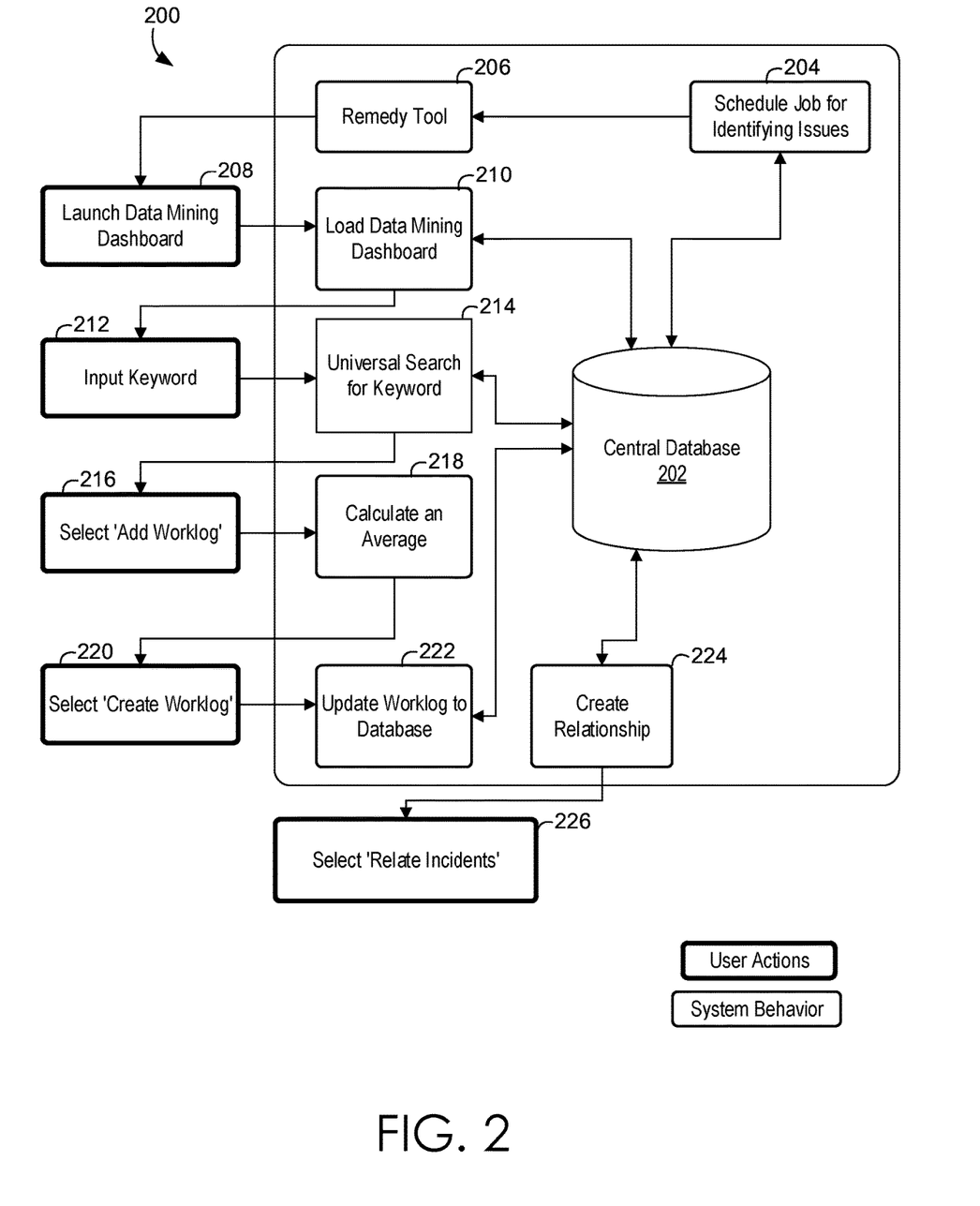
FIG. 2 is an example computing system of the proactive problem analyzer, in accordance with aspects of the present disclosure.

Turning now to FIG. 2, example PPA 200 comprises central database 202, schedule job for identifying issues 204, remedy tool 206, load data mining dashboard 210, universal search for keyword 214, calculate average 218, update worklog to database 222, and create relationship 224. Additionally, user actions receivable by the PPA 200 include launching data mining dashboard 208, inputting keyword 212, select "add worklog" 216, and select "create worklog" 220.

Turning to central database 202, the central database 202 may be located on one or more server devices. In some aspects, central database 202 comprises a table with a plurality of fields corresponding to fields associated with network quality issues. In some embodiments, the fields additionally correspond to symptoms, causes, solutions, and remedial actions taken that are associated with their respective network quality issue. In some embodiments, the central database 202 comprises multiple tables associated with a plurality of sources.

Turning to 204, scheduling the job for identifying network quality issues may comprise collecting scheduled jobs based on received network error information, wherein the network error information is received from a plurality of different clients. In aspects, the network error information received is cleansed and indexed in the central database 202 using natural language processing and keyword extraction, as discussed above with respect to the NLP 114 and keyword learning 116, for example. For example, cleansing may include removing duplicate information and filtering irrelevant data (e.g., data providing a cause that is inconsistent with the solutions provided). Further, issues may be identified by aggregating the cleansed and indexed information based on one or more of a client, a network quality issue type, a location, a keyword, or any combination thereof. By identifying the network quality issues via the aggregated information, computer processing instructions are reduced.

Additionally, by reducing the computer processing instructions and by reducing manual efforts, network quality issues are identified faster, more accurately, and more energy corresponding to computing resource is saved. By consolidating the indexes in the central database 202 and by cleansing and indexing the information received in the central database 202, PPA 200 eliminates the following steps to conserve computing and energy resources: fetching results from various incident indexes, fetching resolutions from incident indexes, fetching resolutions from change indexes, and fetching resolutions from problem indexes. As such, PPA 200 reduces analysis time by three times compared to existing systems and methods.

Turning to remedy tool 206, remedy tool 206 may identify changes to service levels, service requests, identities associated with clients, and the like. The remedy tool 206 may update information associated with the received network error information. In addition, upon accessing the remedy tool 206, a user may make a selection to launch the data mining dashboard 208. Upon receiving the selection, the PPA 200 may load the data mining dashboard 208. For example, a user interface may display the data mining dashboard 208, which may allow a user to view, for example, the aggregated data. In aspects, the user may provide additional reports and additional reporting information via the data mining dashboard 208. The data mining dashboard 208 may also provide sharing options and templates for providing information and sharing the information. In some aspects, the user may provide a keyword for PPA 200 to perform a universal search 214 among the data stored in the central database 202.

In response to the PPA 200 performing the universal search 214, the PPA 200 calculates an average number of network issues reported by various clients and stored in the central database 202. In aspects, the average is calculated for a period of time (e.g., an average number of issues reported within the last 30 days). In some aspects, the PPA 200 calculates an average processing time for at least one of the following: loading data from the various clients, loading data modified within a time range, identifying a symptom, logging an electronic document, logging a problem ticket, searching the central database 202, and/or identifying a relationship between a current network issue and one or more issues reported and stored in the central database 202.

In response to calculating the average at 218, a user may make a selection at 220 for creating a worklog. In response to the selection to create the worklog, the PPA 200 updates the worklog to the central database 202. In response to updating the worklog, the PPA 200 creates a relationship 224 that was identified between the current network issue and the one or more stored issues. Accordingly, a user may make a selection at 226 that confirms that the relationship.

Figure 3A:
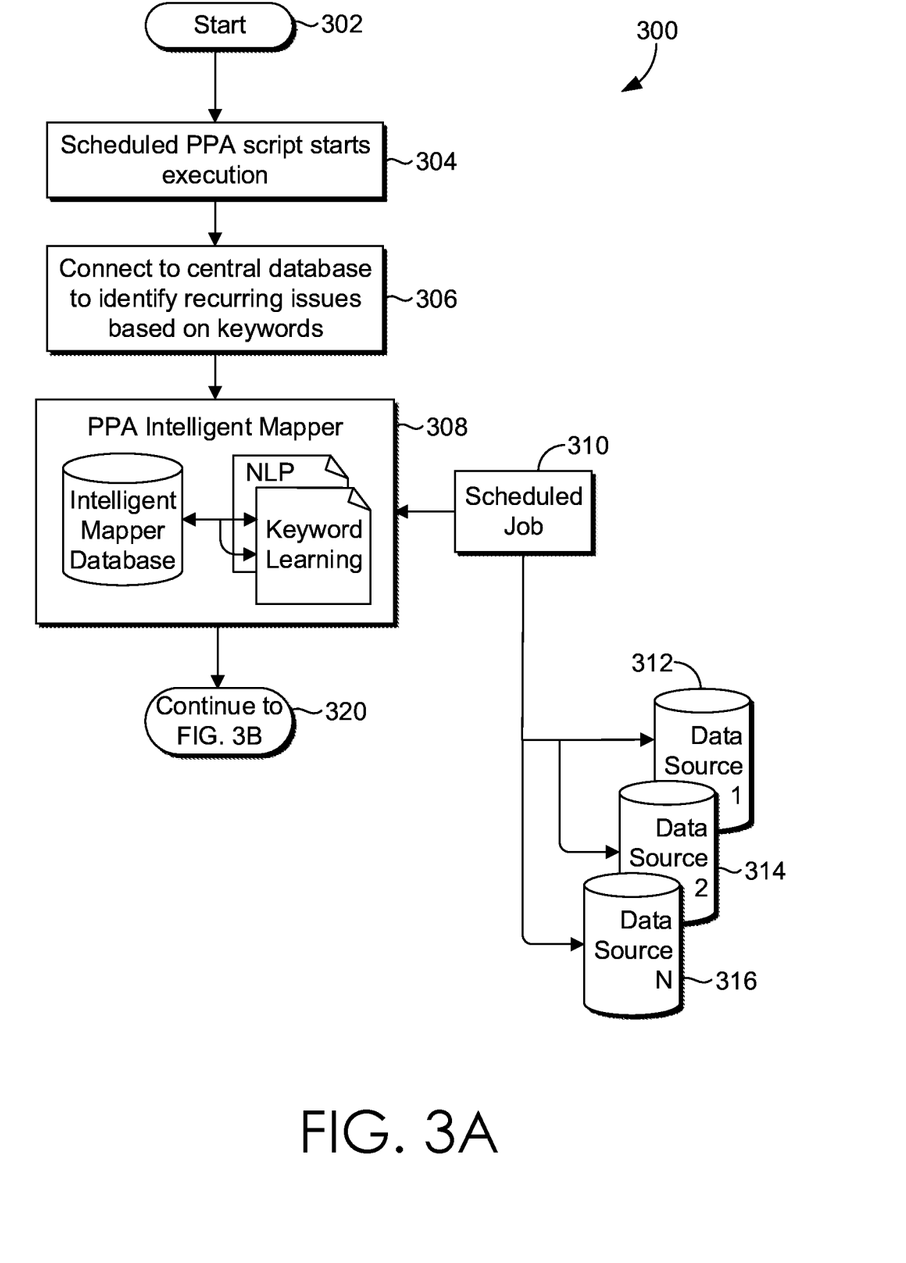
FIGS. 3-4 include example flowcharts, in accordance with aspects of the present disclosure.

Turning now to FIG. 3A, flowchart for a method 300 begins at "start" 302. At 304, a scheduled PPA script begins execution. For example, the script may include instructions for altering or modifying a subnetwork to address a network issue, such as a network quality issue. Additionally, at 306, the method 300 provides for a connection to a central database for identifying recurring issues based on keywords. For example, a network quality issue may be a recurring issue if the network quality issue corresponds to a particular keyword. In some aspects, the network quality issue may be a recurring issue if the network quality issue information received by proactive problem analyzer comprises the keyword a number of times that satisfies a threshold.

PPA intelligent mapper 308 receives scheduled jobs 310 from various clients. The scheduled jobs comprise one or more network quality issues from one or more of the various clients, and one or more of those network quality issues may have been previously determined to be recurring issues. In aspects, each client has a corresponding data source. In an embodiment, a first client is associated with data source 312, a second client is associated with data source 314, and a third client is associated with data source 316. In some embodiments, more than one client are associated with one data source. In response to PPA intelligent mapper 308 receiving scheduled job 310, the flowchart of the method 300 continues to FIG. 3B at 320.

Figure 3B:
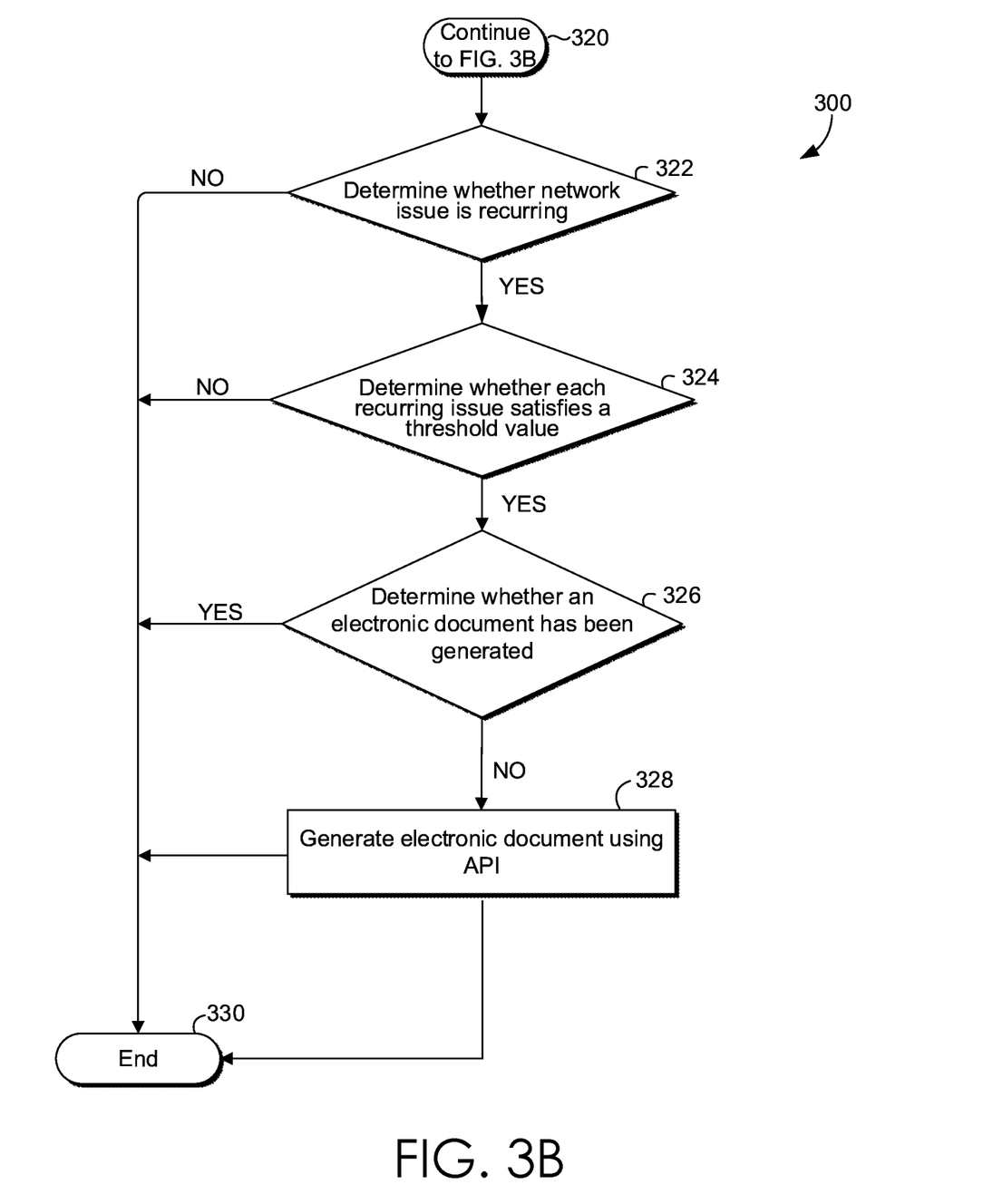

The method 300 continues with a determination of whether the network quality issue is a recurring issue at 322. For example, a recurring issue may be determined based on a keyword being associated with the network quality issue. In aspects, the issue is determined to "recurring" when that particular issue has been reported at least a threshold number of times. Continuing the example, when the network quality issue is associated with a specific server, and when a number of clients each report that same network quality issue, and when the total number of the occurrence of the network quality issue is at or above a defined threshold, then that network quality issue can be determined to be a recurring issue associated with the specific server. When the network quality issue is determined to not a recurring issue, the method terminates at 330 and can be initiated for other jobs and issues.

When the network quality issue is a recurring issue, the method 300 determines that each recurring issue also satisfies a threshold value 324, distinct from the defined "recurring" threshold discussed above. The threshold value 324 is used to determine whether the network quality issue that has been determined to be a recurring issue should be prioritized relative to other recurring issues in the network, in various aspects. For example, a first recurring issue relating to a first application (e.g., slow response time) may have a different threshold value 324 than a second recurring issue relating to a second application, wherein the second application is utilized less than the first application by one or more clients.

Continuing the example, the first recurring issue may have a lower quantity of required occurrences associated with a first threshold value relative to a second threshold value for the second recurring issue, since the first recurring issue is a problem of higher priority to the one or more clients with respect to the first application being utilized more. In aspects, the first recurring issue having the relatively lower threshold may be a network quality issue that has a relatively higher predetermined priority to a user or client such that fewer occurrences are needed to satisfy the respective threshold to elevate that network quality issue to a reoccurring issue for that user or client. For example, the predetermined priorities may be determined based on an individual user and used to define the threshold values for respective network quality issues that are determined to be recurring issues. In some aspects, the predetermined priorities may be determined based on a plurality of users associated with the clients corresponding to the network issues stored in the central database.

In some aspects, the threshold value 324 for prioritization is satisfied based on whether the recurring issue has a number of predicted symptoms, wherein the number of predicted symptoms is determined based on an identical network quality issue that was previously reported and stored in the central database as having the symptoms being used as the number of predicted symptoms. As another example, the method 300 may determine that the recurring issue has a threshold value 324 that is satisfied based on the recurring issue having particular operational data associated with a particular server. Continuing the example, the particular operational data may be associated with a specific error code generated when one or more clients reported instances of the recurring issue associated with the particular server. When one network quality issue that is a recurring issue does not satisfy the threshold value 324 for that particular network issue, the method ends at 330 for that one network quality issue because the network quality issue, albeit a recurring issue, is not to be prioritized because it does not satisfy the threshold value 324.

When the threshold value 324 for prioritization is satisfied by a network quality issue that was determined to be a recurring issue, the method 300 then determines at 326 whether an electronic documentation was generated previously for the recurring issue based on another dataset or a prior instance of the network quality issue. For example, determining whether the electronic documentation was generated at 326 may include performing a query on electronic documents associated with network quality issues stored in the central database. For example, NLP may be used for extracting keywords from the central database for the electronic documentation search. Further, when it is determined that the electronic documentation was generated previously, the method ends at 330 for this recurring issue and other network quality issues are evaluated.

When it is determined that the electronic documentation was not generated and/or does not exist for the recurring issue, the method 300 generates a new electronic documentation using application programming interface at 328. An electronic documentation tool may be used for generating the electronic documentation (e.g., by invoking an application programming interface call to the electronic documentation tool). The electronic documentation tool may comprise electronic documentation management software for creating the electronic document. Additionally, the method 300 may also transmit a notification to a user device for indicating that the electronic documentation has been created for the network quality issue that is a first recurring issue.

For example, the notification may be transmitted for display on a graphical user interface of the user device. In aspects when a second electronic documentation is generated for a second recurring issue that satisfied the threshold 324, the notification may indicated that both the electronic documentation and the second electronic documentation associated with a second recurring issue have been created. In some aspects, as discussed in more detail above, the threshold 324 (i.e., the condition for root cause investigation for the recurring issue) for the recurring issue is different than the threshold 324 for the second recurring issue. Furthermore, the notification may comprise an image or an alert. As such, the method 300 ends at 330.

Figure 4:
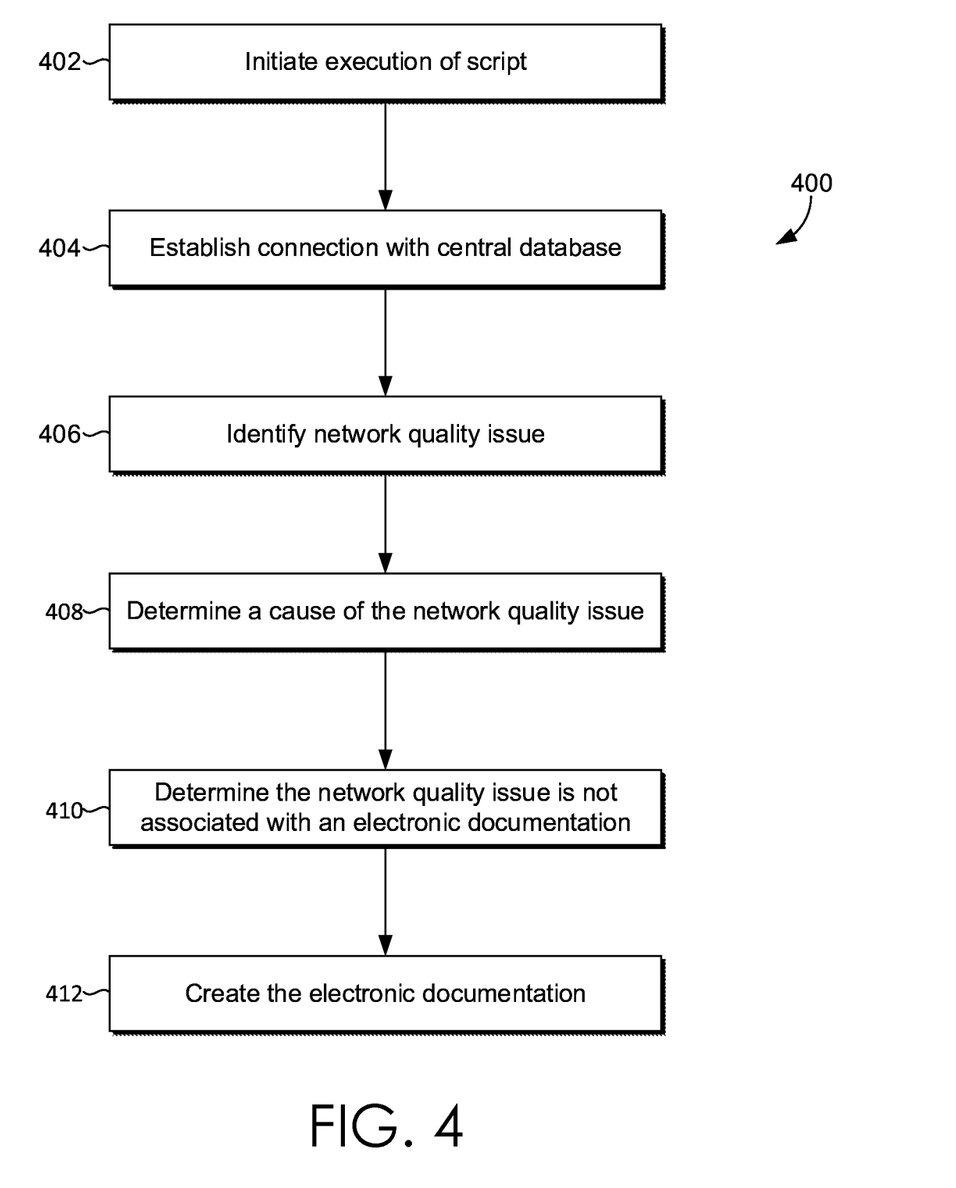

Turning to FIG. 4, a flowchart of a method 400 begins with initiating execution of a script at 402. In aspects, a script may be generated by compiling instructions in a file. Continuing the example, the instructions may include commands for nodes in the subnetwork for the network issues. In aspects, the script may include computing issue error details including, but not limited to, a time and date of a particular error, a description of the error, an impact of the error, a line number corresponding to the error and to a synchronization rule, etc.

At 404, a connection with a central database is established. For example, the connection may be established for identifying a network issue, such as a network quality issue. Further, the connection may be established based on the script. In some aspects, the connection is established for identifying at least one network issue among a plurality of network issues corresponding to one or more networks and subnetworks. In addition, the central database may comprise a relational database having organized tables or "datasets" corresponding to network issues, unresolved network issues, and prior solutions to network issues. In some aspects, the central database is an Open vSwitch® (OVS®) Database. In some aspects, the central database may support multiple clients or "tenants" within one organization or across various organizations.

In aspects, the central database stores electronic documents from a plurality of sources (e.g., a source from an emergency department and a source from a laboratory from a facility other than the emergency department), the electronic documents being associated with network issues. In aspects, each of the plurality of data sources have a distinct index of electronic documentations for network issues. For example, one of the plurality of data sources may have an indexing system based on different solution codes than another one of the plurality of data sources. Continuing the example, data from data sources having different solution codes would be cleansed and homogenized to a standard solution-coding scheme in order to proceed with aspects discussed herein. In aspects, the data from the plurality of data sources may be standardized based on a coding scheme of a particular client.

In some aspects, data stored at the database is indexed based on a network issue type. For example, the network issue type may include an application error, a connection error, a domain name system error, a link or node failure, a control plane failure, and so forth. In some aspects, one or more applications having a common network issue may have a higher risk to another network issue relative to other applications that do not have the common network issue. Further, an index table of the data that is organized based on the network issue type may be further organized based on prior solutions to the network issue type. In embodiments, the data indexed by network issue type may be further sub-indexed by client. For example, one client may provide a different solution to a particular type of network issue than the solutions provided by another client for the particular type of network issue. In some aspects, the data is indexed by client and then further sub-indexed by the type of network issue.

In some embodiments, the data is indexed based on a keyword or a phrase having one or more words in a defined sequence of alphanumeric characters. For example, NLP (e.g., via a string of characters and optical character recognition) may be used for indexing data stored at the central database. For example, an NLP technique may be used to process a script or electronic documentation for a client name. In some embodiments, the NLP technique may be used to process a script or electronic documentation for a particular type of network issue and prior solutions to the particular type of network issue associated with the client name. In some embodiments, the prior solutions are extracted and mapped to the particular type of network issue associated with other client names. In some embodiments, an NLP technique may be used to extract a keyword or phrase from the central database corresponding to a particular error detail, such as a time and date of a particular error.

In some aspects, the data is cleansed prior to indexing. In some aspects, the data is also cleansed after indexing. For example, NLP and keyword extraction may be used to determine information stored in the central database is a duplicate and to remove the duplicate information. In some aspects, only data associated with electronic documents generated within a particular date range is cleansed. In some aspects, only data received by a particular source is cleansed. In some embodiments, cleansing includes removing unresolved reported computing problems that were reported prior to a particular date and unresolved after a particular date. In some embodiments, cleansing includes removing error reports having a solution unrelated to the error report.

In some aspects, the data that was cleansed and indexed is aggregated. The data may be aggregated via a script, and may be aggregated based on a client, a network quality issue type, a location, and a keyword. In some aspects, the aggregated data is stored in the central database and used to identify current network issues. In some aspects, the current network issue is identified by mining the aggregated data and identifying a pattern. In aspects, the pattern is associated with prior solutions to the network issue identified. For example, the pattern may be identified upon aggregating data associated with a particular client, having the same network quality issue type, and located in a particular index of the central database, wherein the index location is determined based on a particular keyword.

Furthermore, processing speed and accuracy are improved by aggregating the cleansed and indexed data. In aspects, the aggregated data may include cleansed data having duplicate data removed, the cleansed data comprising error details including a description of the error and an impact of the error, wherein the aggregated data includes data from a plurality of sources. Continuing the example, the plurality of sources may be provided as electronic documents reporting network errors and/or issues from a first hospital and a second hospital, wherein the first hospital is an acute care hospital and the second hospital is a rural hospital. Further continuing the example, all of the aggregated data may correspond to one particular type of network issue or two or more related types of network issues.

The two or more related types of network issues may be related based on having common symptoms, such as electronic reports indicating that the network is down. In some aspects, types of network issues are related based on having a number of common symptoms being above a threshold number. In some aspects, two related types of network issues may include two different server connection issues, wherein the corresponding electronic reports to those issues indicate that the network is down. As another example, related types of network issues may include network issues having a common symptom of slow application performance.

Turning now to 406, a network quality issue is identified. In aspects, the network quality issue is a failure to receive an Internet Protocol address from a server, which causes network symptoms including one or more of inoperability of the network and failure to configure the address. In aspects, the network quality issue is a failure to connect to an application server, which causes network symptoms including a failure to receive an email or a failure to transmit an email. In aspects, the network quality issue is a reduction in response time corresponding to an application, which causes network symptoms including freezing.

In aspects, the network quality issue is identified based on the network quality issue satisfying a threshold. In aspects, the threshold corresponds to a number of instances or "times" the network quality issue occurred within a predetermined period of time. Continuing the example, the threshold may additionally correspond to a central processing unit utilization level of a client reaching a threshold (e.g., 99%). In some aspects, the threshold corresponds to a number of problem tickets or electronic documents generated for the network quality issue. In some aspects, the threshold corresponds to a number of problem keywords identified within the aggregated data stored in the central database, wherein the problem keyword relates to the network quality issue (e.g., a keyword relating to a client and an application having a reduced response time).

In aspects, the network quality issue may be identified by querying the central database and analyzing a plurality of network quality issues occurring in operational data of one or more clients or sources (e.g., a first and a second hospital). Examples of the operational data may include information about user interaction history with a problematic application or other user function, information about prior issues with the application or the other user function, information about previously patched connections, and previous software releases based on a severity of a software problem. Continuing the example, upon analyzing the operation data, a pattern within the operational data that is associated with a particular keyword may be identified. For example, the problem keyword identified may be associated with a location of the previously patched connections.

In aspects, client information stored in the central database and associated with the plurality of network quality issues are also analyzed for identifying the network quality issue. For example, client information may be associated with an error message or an error code corresponding to the client. Further, the client information may include information corresponding to software that the client is using for operations, a page name and a page header corresponding to the error message or the error code, a transaction name, a product name, a business name, a business process name, a business domain name, a problem severity corresponding to the error message or the error code, a time of submission of the error message or the error code, a selected or determined problem priority, an email associated with the error message or the error code, and so forth. Keywords associated with the client information may be used for identifying the network quality issue.

In aspects, the network quality issue may be identified by querying the central database and retrieving a set of a plurality of network quality issues reported within a particular time period. In aspects, each of the set of the plurality of network quality issues correspond to a client and to a keyword. For example, the keyword may identify a particular application that is failing to connect to a server of the particular application. Upon retrieving the set of a plurality of network quality issues reported within the particular time period (e.g., within a few hours of the day) that correspond to the client and having the keyword, the network quality issue may be identified as an issue associated with the server of the particular application.

In some aspects, a second network quality issue is identified in addition to the "first" network quality issue above at 406 of FIG. 4. For example, the second network quality issue may be identified based on querying the plurality of network quality issues and their respective data stored in the central database. In aspects, the second network quality issue is identified based on a determination that the second network quality issue satisfies a second threshold. In aspects, the second threshold corresponds to a number of occurrences the second network quality issue occurred within a predetermined period of time, wherein the second threshold is a higher number of occurrences relative to the first threshold utilized when identifying the first network quality issue. In some aspects, the second threshold defines a number of keywords to be identified within the aggregated data stored in the central database to satisfy that second threshold, wherein the number of keywords defined for the second threshold is higher than the number of keywords defined for the first threshold.

Turning now to 408, a cause of the network quality issue is determined. In some aspects, the cause (e.g., a root cause) is determined based on a query of the central database. In aspects, the query for the cause includes mining the data that was aggregated and stored in the central database. In aspects, the cause is determined based on identifying a first set of data from the data stored and indexed, wherein the cause is further determined based on a keyword or a phrase corresponding to the network quality issue (e.g., a network quality issue type, a client name, an application response time, etc.). Further, the cause may also be determined based on identifying a second set of data that corresponds to a second network quality issue.

In aspects, the second network quality issue and the first network quality issue have a common symptom, such as a failure to access a first application. Continuing the example, the second set of data used to determine the cause of the second network quality issue may have a different network quality issue type than the network quality issue type of the first set of data that was used for the first network quality issue. In aspects, the second set of data and the first set of data include the same keyword, such as a particular client name, user name, symptom description, and/or prior solution description. Stated differently, the second network quality issue may be associated with the same client as the first network quality issue. In some embodiments, the second cause may be different than the cause for the first network quality issue, independent of whether both issues are associated with the same client, user name, symptom description, and/or prior solution description.

In embodiments, a cause for a network quality issue/recurring issue for which electronic documents have been generated to detail high resource consumption may include incomplete virtual machine migration. In embodiments, a cause for a network quality issue/recurring issue of the electronic documents associated with virtual machine migration may include insufficient resources at a particular physical host. In embodiments, a cause for network quality issue/recurring issue of the electronic documents associated with a server connectivity issue that is sporadically occurring may include a server that is busy and unresponsive. In embodiments, a cause for a server connectivity issue that is continuously occurring may include an issue with routing on the network connecting the client and the server.

Continuing with FIG. 4 at 410, it is determined that the network quality issue that was identified at 406 as satisfying the threshold is not associated with any existing electronic documentation (e.g., there are no records or electronic documents stored that correspond to the network quality issue). In such aspects, this determination is made based on a search in the central database. For example, the search in the central database for the electronic documentation may include establishing a connection, via the script, to a network quality issue management system in communication with the central database. The management system may comprise a plurality of processors operating in parallel. The management system may also comprise subsystems of the plurality of processors. In some aspects, the network quality issue management system comprising the plurality of processors operating in parallel may determine the cause of the network quality issue in parallel to identifying the second network quality issue. In some embodiments, the second network quality issue determined in parallel is associated with the cause of the network quality issue. In some aspects, the network quality issue management system determines that the second network quality issue is not associated with an electronic documentation, which may be determined in parallel to determining the cause of the network quality issue.

At 412 of FIG. 4, the electronic documentation is created for the network quality issue(s) that satisfied the threshold(s). In aspects, the electronic documentation includes the cause(s) for each of the network quality issue(s) that are recurring issues based on threshold satisfaction. In aspects, when it is determined that there is presently no electronic documentation for the network quality issue, new electronic documentation is automatically generated to document the network quality issue. In some aspects, it is determined that there is already an electronic documentation associated with the network quality issue, but this electronic documentation does not include a cause. Continuing the example, since the electronic documentation does not include the cause, a new electronic documentation including the clause is automatically generated.

Figure 5:
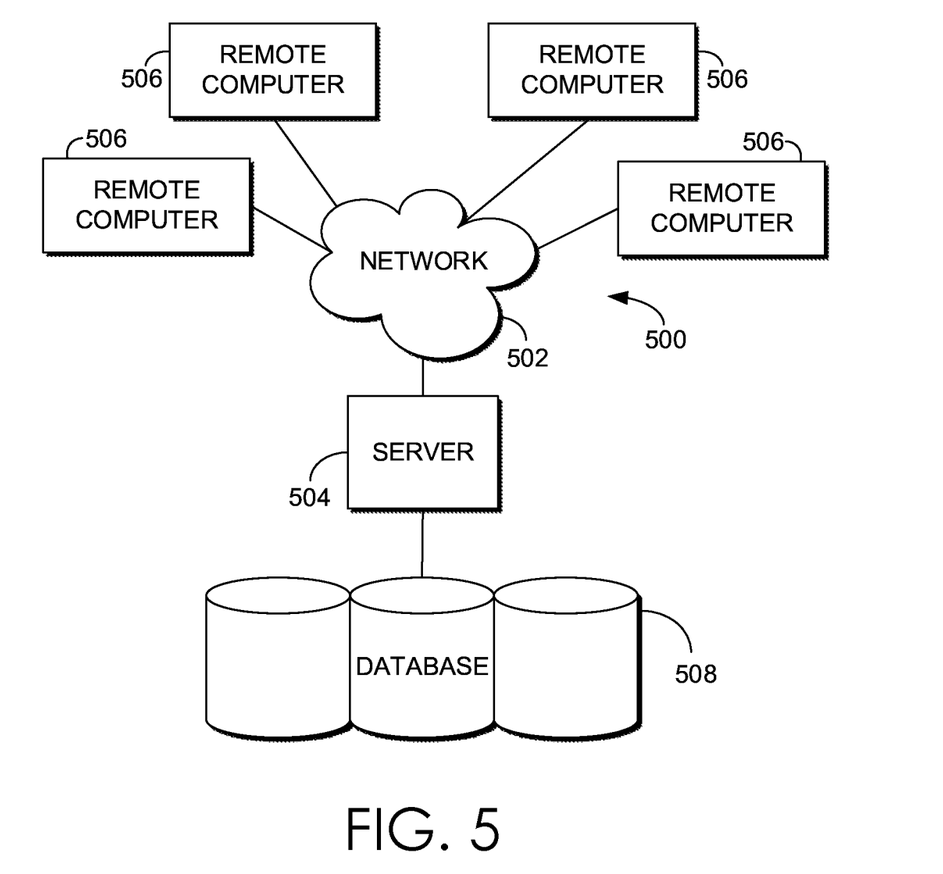
FIG. 5 is a diagram of an example computing environment that is suitable for implementation of the system, media, and methods discussed, in accordance with aspects of the present disclosure.

Turning now to FIG. 5, a computing environment 500 is depicted, in accordance with an aspect of the present invention. It will be understood by those of ordinary skill in the art that the computing environment 500 is just one example of a suitable computing environment and is not intended to limit the scope of use or functionality of the present invention. Similarly, the computing environment 500 should not be interpreted as imputing any dependency and/or any requirements with regard to each component and combination(s) of components illustrated in FIG. 5. It will be appreciated by those having ordinary skill in the art that the connections illustrated in FIG. 5 are also example as other methods, hardware, software, and devices for establishing a communications link between the components, devices, systems, and entities, as shown in FIG. 5, may be utilized in implementation of the present invention. Although the connections are depicted using one or more solid lines, it will be understood by those having ordinary skill in the art that the example connections of FIG. 5 may be hardwired or wireless, and may use intermediary components that have been omitted or not included in FIG. 5 for simplicity's sake. As such, the absence of components from FIG. 5 should be not be interpreted as limiting the present invention to exclude additional components and combination(s) of components. Moreover, though devices and components are represented in FIG. 5 as singular devices and components, it will be appreciated that some aspects may include a plurality of the devices and components such that FIG. 5 should not be considered as limiting the number of a device or component.

Continuing, the computing environment 500 of FIG. 5 is illustrated as being a distributed environment where components and devices may be remote from one another and may perform separate tasks. The components and devices may communicate with one another and may be linked to each other using a network 502. The network 502 may include wireless and/or physical (e.g., hardwired) connections. Examples of networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 502, generally, provides the components and devices access to the Internet and web-based applications.

The computing environment 500 comprises a computing device in the form of a server 504. Although illustrated as one component in FIG. 5, the present invention may utilize a plurality of local servers and/or remote servers in the computing environment 500. The server 504 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The server 504 may include or may have access to computer-readable media. Computer-readable media can be any available media that may be accessed by server 504, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 504. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the server 504 uses logical connections to communicate with one or more remote computers 506 within the computing environment 500. In aspects where the network 502 includes a wireless network, the server 504 may employ a modem to establish communications with the Internet, the server 504 may connect to the Internet using Wi-Fi or wireless access points, or the server 504 may use a wireless network adapter to access the Internet. In example computing environment 500, the server 504 engages in two-way communication with any or all of the components and devices illustrated in FIG. 5, using the network 502. Accordingly, the server 504 may send data to and receive data from the remote computers 506 over the network 502.

Although illustrated as a single device, the remote computers 506 may include multiple computing devices. In an aspect having a distributed network, the remote computers 506 may be located at one or more different geographic locations. In an aspect where the remote computers 506 is a plurality of computing devices, each of the plurality of computing devices may be located across various locations, such as buildings in a campus, medical and research facilities at a medical complex, offices or "branches" of a banking/credit entity, etc. In an aspect, the remote computers 506 are mobile devices that are wearable or carried by personnel, attached to one or more vehicles, or trackable items in a warehouse, for example.

In some aspects, the remote computers 506 are physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 506 may be physically located in a non-medical setting, such as a packing and shipping facility or deployed within a fleet of delivery or courier vehicles.

Continuing, the computing environment 500 includes a data store 508. Although shown as a single component, the data store 508 may be implemented using multiple data stores that are communicatively coupled to one another, independent of the geographic or physical location of a memory device. Example data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Example data stores may also store data in the form of electronic records, for example, electronic medical records of patients, transaction records, billing records, task and workflow records, chronological event records, and the like.

Generally, the data store 508 includes physical memory that is configured to store information encoded in data. For example, the data store 508 may provide storage for computer-readable instructions, computer-executable instructions, data structures, data arrays, computer programs, applications, and other data that supports the functions and action to be undertaken using the example computing environment 500 and components shown in FIG. 5.

Example computing environment 500 has distributed components that are communicatively coupled via the network 502. Further, program modules may be located in local and/or remote computer storage media including, for example, memory storage devices. Aspects of the present invention may be described in the context of computer-executable instructions, such as program modules, being executed by a computing device. Program modules may include, but are not limited to, routines, programs, objects, components, and data structures that perform particular tasks or implement particular abstract data types. In aspects, the server 504 may access, retrieve, communicate, receive, and update information stored in the data store 508, including program modules. Accordingly, the server 504 may execute, using a processor, computer instructions stored in the data store 508 in order to perform aspects described herein.

Although internal components of the devices in FIG. 5, such as the server 504, are not illustrated, those of ordinary skill in the art will appreciate that internal components and their interconnection are present in the devices of FIG. 5. Accordingly, additional details concerning the internal construction device are not further disclosed herein.

The present invention has been described in relation to particular aspects, which are intended in all respects to be illustrative rather than restrictive. Further, the present invention is not limited to these aspects, but variations and modifications may be made without departing from the scope of the present invention.

What is claimed is:

1. A system for proactively managing computing problems, the system comprising: a central database; a processor; and a computer memory storing computer-usable instructions that, when executed by the processor, causes initiation of a plurality of operations, the plurality of operations comprising:
    executing a script;
    establishing a connection via the script to the central database for identifying a network quality issue;
    identifying the network quality issue based on the network quality issue satisfying a threshold;
    based on a search associated with the central database, determining that other electronic documentation was already created for the network quality issue and that the other electronic documentation does not include a cause of the network quality issue; and
    automatically generating new electronic documentation, for the network quality issue, that includes the cause based on the other electronic documentation not including the cause.

2. The system of claim 1, wherein the operations further comprise: invoking an application programming interface call, to an electronic documentation tool, to create the electronic documentation.

3. The system of claim 1, wherein the operations further comprise transmitting a notification to a user device, the notification indicating that the electronic documentation has been created for the network quality issue.

4. A system comprising a processor and a computer memory storing computer-usable instructions that, when executed by the processor, cause initiation of operations comprising:
    executing a script;
    establishing a connection via the script to a central database for identifying a network quality issue;
    identifying the network quality issue based on the network quality issue satisfying a threshold, wherein identifying the network quality issue comprises:
        receiving data from a plurality of data sources, the data corresponding to a reduced response time associated with the network quality issue;
        cleansing and indexing the data using natural language processing and keyword extraction;
        aggregating, via the script, the cleansed and indexed data based on one or more of a client, a network quality issue type, a location, or a keyword;
        storing the aggregated data in the central database; and
        using the aggregated data to identify the network quality issue;
    based on a search associated with the central database, determining that content indicating the network quality issue is not associated with stored electronic documentation; and
    creating the electronic documentation for the network quality issue.

5. The system of claim 4, wherein the operations further comprise mining the aggregated data stored in the central database to determine a cause of the network quality issue.

6. The system of claim 5, wherein the operations further comprise mining the aggregated data stored in the central database to determine a cause of the network quality issue concurrently with identifying a second network quality issue via parallel processing, and wherein the second network quality issue is associated with the cause of the network quality issue.

7. The system of claim 4, wherein each source of the plurality of data sources comprises a distinct index of electronic documentations for a plurality of network quality issues.

8. The system of claim 4, wherein determining that content indicating the network quality issue is not associated with stored electronic documentation comprises:
    establishing a connection via the script to a network quality issue management system that is in communication with the central database; and
    performing a query on electronic documentation data associated with network quality issues stored in the central database.

9. One or more non-transitory media having instructions embodied thereon that, when executed by a processor, cause initiation of operations for proactively managing computing problems, the media operations comprising:
    executing a script;
    establishing a connection via the script to a central database for identifying a network quality issue;
    identifying the network quality issue based on quality issue satisfying a threshold;
    based on a search associated with the central database, determining that other electronic documentation was already created for the network quality issue and that the other electronic documentation does not include a cause of the network quality issue; and
    automatically generating new electronic documentation, for the network quality issue, that includes the cause based on the other electronic documentation not including the cause.

10. The one or more non-transitory media of claim 9, wherein the operations further comprise a query of the central database for identifying the network quality issue, and wherein the query of the central database for identifying the network quality issue comprises retrieving a plurality of network quality issues that correspond to log entries generated within a period of time, the plurality of network quality issues corresponding to a client and a keyword.

11. One or more non-transitory media having instructions embodied thereon that, when executed by a processor, cause initiation of operations comprising:
    executing a script;
    establishing a connection via the script to a central database for identifying a network quality issue, the central database comprising indexed data from a plurality of network quality issues from a plurality of sources, wherein the indexed data is indexed based on one or more of a client, a network quality issue type, a location, or a keyword;
    identifying the network quality issue via a first query of the central database, the network quality issue being identified based on the network quality issue satisfying a threshold;
    determining a cause of the network quality issue based on a second query of the central database, wherein determining the cause based on the second query by comprises:
        identifying a first set of data from the indexed data, the first set of data corresponding to the network quality issue; and
        identifying a second set of data from the indexed data, the second set of data corresponding to a second network quality issue, wherein the network quality issue type of the first set of data differs from a network quality issue type of the second set of data, and wherein the second set of data has a same keyword as the keyword of the first set of data;

determining the network quality issue is not associated with electronic documentation; and creating the electronic documentation for the network quality issue, the electronic documentation including the cause.

12. One or more non-transitory media having instructions embodied thereon that, when executed by a processor, cause initiation of operations comprising:

executing a script;

establishing a connection via the script to a central database for identifying a network quality issue, the central database comprising indexed data from a plurality of network quality issues from a plurality of sources, wherein the indexed data is indexed based on one or more of a client, a network quality issue type, a location, or a keyword;

identifying the network quality issue via a first query of the central database, the network quality issue being identified based on the network quality issue satisfying a threshold, wherein the plurality of network quality issues comprise operational data, and wherein identifying the network quality issue comprises analyzing the plurality of network quality issues and identifying a pattern within the operational data that is associated with a particular keyword;

determining a cause of the network quality issue based on a second query of the central database;

determining the network quality issue is not associated with electronic documentation; and creating the electronic documentation for the network quality issue, the electronic documentation including the cause.

13. One or more non-transitory media having instructions embodied thereon that, when executed by a processor, cause initiation of operations comprising:

executing a script;

establishing a connection via the script to a central database for identifying a network quality issue, the central database comprising indexed data from a plurality of network quality issues from a plurality of sources, wherein the indexed data is indexed based on one or more of a client, a network quality issue type, a location, or a keyword;

identifying the network quality issue via a first query of the central database, the network quality issue being identified based on the network quality issue satisfying a threshold;

determining a cause of the network quality issue based on a second query of the central database;

determining the network quality issue is not associated with electronic documentation;

creating the electronic documentation for the network quality issue, the electronic documentation including the cause;

identifying a second network quality issue that satisfies the threshold, the second network quality issue having a same client as the client corresponding to the network quality issue;

determining a second cause of the second network quality issue based on a detected pattern within a set of data within the plurality of network quality issues, the set of data corresponding to the second network quality issue;

determining second electronic documentation was not already created for the second network quality issue; and automatically creating and documenting the second electronic documentation for the second network quality issue.

14. The one or more non-transitory media of claim 13, wherein determining the second electronic documentation was not already created and automatically creating and documenting the second electronic documentation are performed in parallel via parallel processing by a plurality of processors comprising the processor executing the one more non-transitory media.

15. The one or more non-transitory media of claim 13, wherein the operations further comprise causing for display on a graphical user interface a notification, the notification indicating that the electronic documentation and the second electronic documentation have been created.

16. A computerized method, comprising:

initiating execution of a script;

establishing a connection via the script to a central database for identifying a network quality issue;

identifying the network quality issue based on the network quality issue satisfying a threshold;

based on a search associated with the central database, determining that other electronic documentation was already created for the network quality issue and that the other electronic documentation does not include a cause of the network quality issue; and automatically generating new electronic documentation, for the network quality issue, that includes the cause based on the other electronic documentation not including the cause.

17. The computerized method of claim 16, further comprising determining the cause by analyzing a set of data corresponding to a plurality of network quality issues based on: natural language processing and analyzing prior electronic documentation associated with the set of data.

18. The computerized method of claim 17, wherein the plurality of network quality issues correspond to log entries, generated within a period of time and comprise operational data and client information, and wherein the client information is associated with the set of data and corresponds to at least two different clients.

19. The computerized method of claim 17, wherein:

the set of data is associated with a keyword indicating a network quality issue type for each of the plurality of network quality issues;

the prior electronic documentation is stored in the central database; and determining the cause further comprises: identifying a pattern within operational data associated with the set of data and identifying prior solutions from the prior electronic documentation of the set of data.

* * * * *